United States Patent [19]

Schell

[11] 3,739,826
[45] June 19, 1973

[54] FEED DEVICE
[76] Inventor: Friedrich P. Schell, 4313 San Bernardino Avenue, Las Vegas, Nev. 89102
[22] Filed: Mar. 30, 1971
[21] Appl. No.: 129,507

[52] U.S. Cl. .................. 144/323, 144/154, 83/413, 144/145
[51] Int. Cl. .............................................. B27c 1/00
[58] Field of Search .................. 144/144, 145, 154, 144/321, 323, 325; 83/413, 565

[56] References Cited
UNITED STATES PATENTS

| | | | |
|---|---|---|---|
| 1,337,695 | 4/1920 | Emery | 144/145 A |
| 1,600,261 | 9/1926 | Whitney | 144/145 R |
| 2,426,487 | 8/1947 | Clausing | 144/145 A |
| 2,141,631 | 12/1938 | Whitney et al. | 144/145 A |
| 3,442,309 | 5/1969 | Jentsch | 83/413 X |
| 2,455,423 | 12/1948 | Lansing | 144/145 R |
| 3,367,375 | 2/1968 | Watson, Jr. | 144/154 X |

Primary Examiner—Andrew R. Juhasz
Assistant Examiner—W. D. Bray
Attorney—Jerry R. Seiler

[57] ABSTRACT

A device for feeding materials to be shaped to a shaping tool comprises a rotatable platform supported from its under side. In one embodiment, the device is provided with guide and biasing means which cooperates to provide reciprocal motion to the platform. A piece of shaped material which shape is to be reproduced on a material workpiece is attached to the platform. A guide member is maintained in abutment with the surface of the shaped material while a shaping tool maintained at a fixed distance from the guide member reproduces the shaped surface on the material workpiece.

8 Claims, 4 Drawing Figures

PATENTED JUN 19 1973 3,739,826

INVENTOR.
FRIEDRICH P. SCHELL

BY Jerry R. Seiler

ATTORNEY

INVENTOR
FRIEDRICH P. SCHELL
BY
ATTORNEY 3,739,826

FEED DEVICE

BACKGROUND OF THE INVENTION

A number of devices exist for shaping wood and other materials. Although certain of such devices are relatively simple in design, those which are presently available for reproducing various shapes on materials from a template or other predetermined shape are rather complex and expensive. These latter devices are known in the art as profilers or shapers which incorporate a rotating table to which table a template or other shaped piece of material is attached. The shaping tool extends downwardly from an overarm and follows the edge profile of the template and as the table rotates, the shaping tool reproduces the template profile on a material workpiece. Even more sophisticated shaping device incorporate electronic, computer or tape command means in lieu of a template.

There are a number of problems and disadvantages associated with such devices. A major and important problem is that an operator is required to be near the cutting or shaping tool which close proximity increases the danger of accidental injury to the operator. Injury may result from direct contact of a finger or hand with the cutting tool or the operator may be injured by a piece of cut material propelled by the shaping tool.

Another major disadvantage is in the limitation of the size of the workpiece which may be handled by the particular device. Such a limitation is generally inherent in the apparatus itself because of the various support means present for either the table or the shaping tool. For example, even very expensive shaping or profiling apparatus incorporate a massive side column and an overarm from which the shaping tool or tools extend. Since the overarm and column are fixedly attached to a floor stand or lower frame member to which the table is also attached, there is a limited distance between the table and the column which distance dictates the size of the material workpiece which can be shaped. A further disadvantage is that in order to change the template, or remove the finished workpiece, the device must be stopped thereby significantly slowing the operation.

In addition, such equipment which may be overengineered and unnecessarily complex for many operations is also undesirable from a cost standpoint and requires rather expensive maintenance costs. Where computer or tape reader control systems are utilized, cost and maintenance disadvantages are magnified. Further, once such equipment is placed, because of the weight of the apparatus, sometimes in excess of 20,000 pounds, relocation of the apparatus is obviously difficult.

An additional disadvantage in prior art devices of the type of above described is in the limitation of the type of shaping, cutting or working tools or head assemblies which can be attached. Although such a device may utilize router bits or similar cutting means interchangeably, they are generally unsuitable for sanding, planing, painting or polishing. In other words, once the material workpiece is initially shaped, it must be finished by removing it from the apparatus and working it with independent units which the initial shaping or profiling apparatus is incapable of incorporating.

SUMMARY OF THE INVENTION

The device of the present invention obviates the disadvantages and limitations such as described hereinabove. The basic apparatus of the invention is a device for feeding a workpiece or plurality of workpieces to a shaping tool which tool is separated at a fixed distance from a guide member. The feeding device comprises a rotary platform to which is attached a shaped article which shape is to be copied on the material workpiece by the shaping tool. The workpiece is fed to the shaping tool by the platform.

In a first embodiment of the feed device, the platform is fixed to an axle or drive shaft extending downwardly from the underside of the platform and which axle, and in turn the platform, is driven by suitable drive means so that the platform rotates. The platform is also attached to a lower frame in such a manner that the platform also moves in a reciprocating motion as it rotates. Biasing means such as a spring or the like extends from the frame to constantly urge the platform in the direction of the guide member whereby the guide member is maintained in abutment with the shaped material surface which is attached to the platform.

In a second embodiment the feeding device of the invention utilizes a rotary platform to which a shaped article and material workpiece in which the shaped article is to be duplicated thereon are attached to the platform, which device includes one or more shaping tools attached to a reciprocating support. Such a device also includes a guide member located at a fixed position from each shaping tool each guide member being maintained in abutment with the surface of the shaped piece attached to the rotating platform by biasing means cooperating with the support means of the shaping tool. As the shaping tool is urged to the rotating platform, the guide member cooperating with the tool maintains abutment with the surface of the shaped piece and the shaping tool reproduces the shapes on the material workpiece fed to the tool by the rotating platform to which the workpiece is attached.

A further embodiment of the invention utilizes the rotating motion of the shaping tool to provide the drive means for rotating the platform as well as eliminating the requirement for separate biasing means for either the feed device or the shaping tool. Again, the shaping tool is provided with a guide member which is constantly urged to abut a pre-shaped surface or piece attached to the platform which urging is provided by the motion of the shaping tool itself. In this embodiment the shaping tool or the platform must be provided with support means which allow free reciprocating movement thereof. Specific details of the apparatus, its operation and advantages will be more fully explained hereinafter.

DETAILED DESCRIPTION OF THE INVENTION

Figure 1:
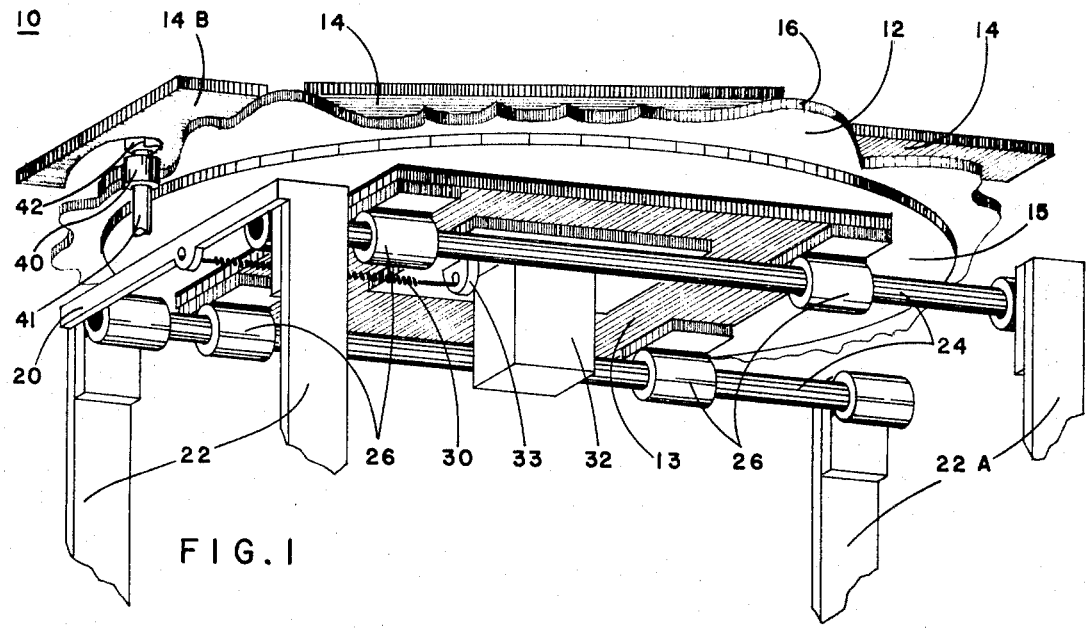
FIG. 1 is a perspective view of the underside of one embodiment of the feeding device of the invention.

Referring to FIG. 1 there is shown a feeding device 10 having a platform 12 to which is attached a plurality of material workpieces 14. The edge 16 of the platform 12 is shaped or contoured to provide a variety of different shapes which are to be reproduced on the workpieces 14. The platform 12 is fixedly attached to platform support 15 which is disc-shaped and which rotates about a centrally located axle (not shown).

A plurality of guide sleeves 26 are attached to an upper support frame 13 by bracket members 27 bolted or otherwise affixed to the upper support frame 13. A pair of guide rods 24 extends substantially parallel to one another and their respective ends are attached to corner posts 22 which may be attached to upper support frame 13 by cross member 20 or equivalent means.

A supporting frame in addition to the corner posts 22 may incorporate lower side and end supports not shown. It should be appreciated that the construction of a support frame is not critical and any similar or equivalent frame means may be used to support the guide rods 24. However, the frame should be of such a construction and mass so that once the device is placed in a desired location, it will not be easily dislocated. Although not shown, brackets or other suitable means may be provided to attach the supporting frame to a floor.

The platform 12 is provided with reciprocal movement between forward posts 22 and rear posts 22A by sleeves 26 which travel along guide rods 24. The sleeves 26 are provided with internal bearing surfaces to minimize friction during travel of the sleeves along the guide rods 24. An expandable spring 30 is attached between frame cross member 20 and bracket 33. In this manner, the platform 12 is continually biased in linear direction toward the forward end of the frame, i.e., to the point of spring attachment by the spring 30 cooperating with the frame and the bracket 33.

A drive means for rotating the platform 12 is a motor 32 which drives an axle (not shown) attached to the platform. The drive means may be reversible or single direction and may incorporate various drive gears engaging gear teeth on the axle. The drive means may also be variable or single speed although a variable speed motor will be preferable. Other drive means such as frictional engagement, chain drive means and the like, may also be used.

Although a single spring 30 is shown, a multiple spring may be used on the device if desired. In addition, it should be appreciated that the biasing means for such a device is not limited to spring action but pneumatic, hydraulic or other equivalent biasing means may be substituted for the spring 30.

Figure 2:
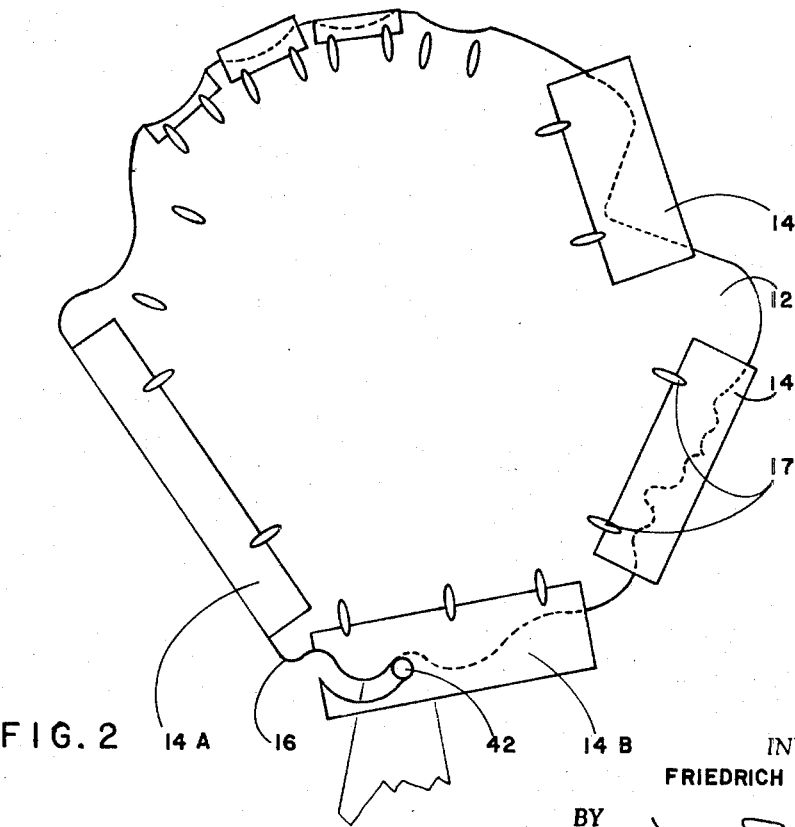
FIG. 2 is a top plan view of the device of FIG. 1.

Referring also to FIG. 2 a shaping tool 42 attached to drive means and apparatus, not shown, is positioned adjacent to the platform 12 to which are attached a series of workpieces 14. Clamps 17 are shown as the means of attaching the workpieces 14 to the platform 12 but the particular means of such attachment is not particularly critical. A guide member 40 having a bearing surface thereon is positioned at a fixed distance from shaping tool 42. Thus, the bearing surface of the guide member 40 is maintained in a constant or fixed position from the shaping tool 42. Since the platform 12 is biased toward a shaping tool 42 by force exerted by the spring 30, the edge 16 of platform 12 is constantly urged to maintain abutment thereof with bearing surface of the guide member 40. It will be appreciated that the shaping tool should be adjustable upwardly or downwardly so that any difference in the elevation of edge 16 and guide member 40 may be compensated for. Further, the position of the guide member 40 in relation to the shaping tool 42 may be varied, i.e., moved to different locations and secured.

As shown, the edge 16 of the platform 12 is continuous and is provided with a variety of shapes. In other words, the edge 16 acts as the template or shaped surface which is to be reproduced on the edges of the workpieces 14 attached to the platform 12. During the shaping operation, the platform 12 will be constantly urged toward the shaping tool 42 whereby abutment of the edge 16 and the guide member 40 is maintained. As the motor 32 or other drive means is energized, the platform 12 rotates so as to feed the workpieces 14 to the shaping tool 42. Depending on the particular distance between a point on the edge 16 and the center of the platform 12, i.e., the platform's axis of rotation, the platform 12 will be displaced reciprocally between the forward and rear ends of the guide shafts 24. Again, this movement will be linear along those shafts 24 and is limited only by the lengths of the shafts 24. Thus, as the continuous edge 16 passes the shaping tool 42, a portion of the workpieces 14 extending beyond the edge 16 will be removed and the resulting shape of the edge of the workpieces shaped by shaping tool 42 will be precisely to the shape of the platform edge 16 over which any individual workpiece 14 extends.

This feature is further evident in FIG. 2 wherein workpiece 14A has been cut by the shaping tool 42 and has been cut according to the shape of the platform edge 16 over which the workpiece 11 originally extended. Workpiece 14B is shown partially cut away with the uncut portion still extending over the platform edge 16 indicated by the dotted lines.

Although the major portion of the platform edge 16 is shown as various curved or contoured surfaces, the device of the invention offers an extremely valuable tool for achieving substantially straight or linear workpiece cuts. This feature is shown additionally in FIG. 2 along a portion of the platform edge which has been provided with a precisely straight linear surface. Accordingly, any workpiece on which a straight edge or side is desired may be attached to the platform directly adjacent the straight surface which will then be reproduced as the workpiece travels past the shaping tool 42. Again, workpiece 14A has been cut along the straight edge portion. It will also be evident that a large workpiece having dimensions limited only by the size of the platform 12 may be attached thereto and shaped.

Although FIGS. 1 and 2 illustrate the shapes to be reproduced on workpieces being that of the shape of the edge 16 of the platform 12, the device is not so limited. Accordingly, different shapes or templates may be attached to the under side or upper side from the platform 12 and the height of either the platform or the shaping tool 42 may be adjusted so that the guide member 40 abuts the attached templet or shaped article. In other words, the device is not limited to the particular shape of the edge of the platform 12 which itself may be of any shape so long as a workpiece may be attached thereto. Accordingly, the shape to be reproduced on a workpiece is not limited to simply platform edge surface shape as shown but may be any shape which can be formed limited only by the type of shaping tool. Further, a plurality of shaping tools may be used in conjunction with the feeding device 10 at various positions around the platform 12 which tools may have different functions including rough shaping, finishing, sanding, polishing, assemblying and the like as will be more fully explained hereinafter.

It will be appreciated that the device shown in FIGS. 1 and 2 provides a continuous feeding of workpieces to be shaped to a shaping tool without interruption. The speed at which the material workpieces can be fed may be varied between very slow and very rapid where a variable speed drive means is provided. In that case, the limitations of the rate at which the pieces may be shaped will depend only on the limits of a shaping tool to cut the materials. Wood, plastics, metals, ceramics, and indeed any material capable of being shaped by a shaping tool may be fed by the apparatus for shaping. Further, the size and initial shape of a workpiece is practically unlimited.

It will also be evident that the safety afforded by the device of the invention is an important advantage and feature. Thus, an operator may stand away from the shaping tool 42 and simply place workpieces along the platform to be shaped and thereafter remove the shaped materials all while the platform is in motion. The device because of its design is extremely useful in operations where speed, precise accuracy, safety as well as unskilled or handicapped labor is desired. Additional safety may be achieved by enclosing the shaping bit. In addition, because of its structure which is unencumbered from either the sides or top of the platform 12 the potential size of workpieces to be shaped is greatly expanded from known devices in the art.

Different shapes may be rapidly provided by attaching those to be used and removing templates having shapes which are no longer desired for reproduction. Further, the size of the device may be varied from that suitable for a small work shop to that which may take very large workpieces by either scaling up or down to any desirable extent the apparatus described herein. The device may also be constructed rather inexpensively and accordingly will be available for operations heretofore requiring high costs and heavy rotary profilers, automatic copying shapers and similar devices. Thus, the only limitation is that a single shaped article desired to be copied be available which will serve as the first template on the feeding device. Once this shape has been copied from a material workpiece, the material workpiece may itself serve as a subsequent template for a further workpiece, and so on until a sufficient number of templates have been prepared for further use on the device. Alternatively where a shaping tool of sufficient height or size is available a single template may serve as the means for simultaneously reproducing that shape in a plurality of stacked workpieces. Obviously, such a feature will greatly increase production rate of shaping or profiling a large number of workpieces.

It should also be understood that the plane of the rotating platform may also be variable. Thus, the device may be provided with means for adjusting the plane from horizontal to vertical or any plane therebetween which may be useful for certain operations. Although the device shown in FIG. 1 incorporates guide rods 24, other guide means may be used such as tracks, channels and the like attached to the frame and cooperating with the biasing means for the described reciprocal movement.

A further embodiment within the purview of the concept is that a device of the type described may have one or more shaping or working tools attached to the platform itself. Accordingly, rather than attaching the workpieces to the rotating and reciprocally moving platform, the shaping tools may be instead attached, and the workpiece passed by the shaping tool or vice versa. The template may be attached to either the platform or otherwise juxtapositioned with the workpiece so long as a guide member cooperating with the shaping tool is maintained in abutment with the template during the shaping operation.

Figure 3:
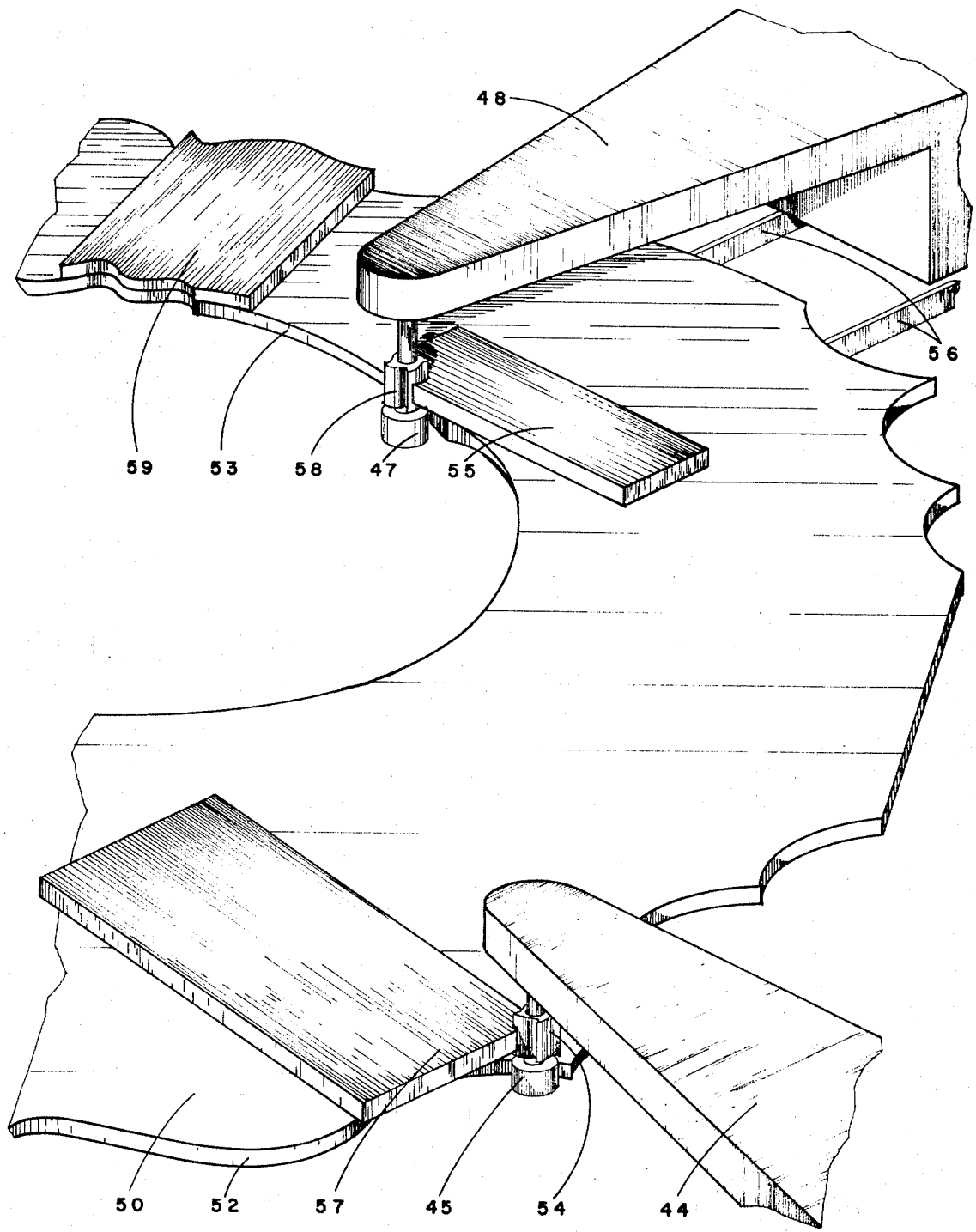
FIG. 3 is a partial view in perspective illustrating another embodiment of the invention.

FIG. 3 illustrates an alternative embodiment of the device of the invention in which the reciprocal action of the device previously explained instead of being provided on the rotable feed device is utilized in conjunction with the shaping tool. As shown in FIG. 3 the flattened ring-shaped platform 50 provides an inner edge 53 and outer edge 52 which serve as a template for shaping material workpieces shown by way of example as 55 and 57. Thus, by using a ring-shaped platform, materials may be shaped both on an inner edge and outer edge simultaneously. In addition, larger workpieces such as workpiece 59 having both sides shaped may be provided. The guide means associated with the platform illustrated in FIG. 1 have been eliminated in this embodiment. The platform 50 may be rotated around a central axis provided by drive shaft attached to a support arm which rotates the platform.

Although a complete ring-shaped platform 50 may be used as described, a segment of such a platform may be used instead. The ring segment may be attached to drive means by an arm member or may be driven by a reversing drive means in which case the segment platform will travel back and forth along an arc or circular portion to accomplish the shaping operation previously described.

Shaping tools 54 and 58 cooperate with platform 50. As shown in FIG. 3, shaping device 54 shapes material workpieces or surfaces which extend over the outer edge 52 of the platform 50 while shaping device 58 is used for cutting and shaping material workpieces extending over the inner edge 53 of the platform 50. Guide tracks 56 provide linear guide means for reciprocal movement of overarms 44 and 48 to which shaping tools 54 and 58 are attached respectively. Biasing means (not shown) acting against the respective overarms or their supporting members urge the shaping tools 54 and 58 toward the platform 50. concomitantly the respective guide members 45 and 47 abut the exterior and interior shaped platform edges. The respective shaping tools 54 and 58 may alternatively be provided with means for reciprocating movement tool including biasing means and shafts cooperating with bearing sleeves of the type shown in FIG. 1. Thus, instead of the platform 50 having reciprocal movement in addition to its rotable motion, the device of FIG. 3 utilizes a rotating feeder in cooperation with reciprocating shaping devices.

The shaping devices 54 and 58 may have the same type of shaping heads or bits or they may differ for different operations as previously explained. Other tools having different functions such as finishing or sanding may also be provided. It will also be appreciated that even a painting device may be used in conjunction with the invention feeder.

A further alternative embodiment of the device of the type shown in FIG. 3 could include a drive motor and a circumferential gear track, or friction surface attached to the underside of ring-shaped platform 50. In that case, an operator could also stand in the center area of the platform and attach and remove shaped materials and templates to be copied as well as material workpieces. With such a device, a shaping tool attached to an arm extending under the platform 50 could be utilized. Other advantages within the purview of such an embodiment will be evident to those skilled in the art.

Figure 4:
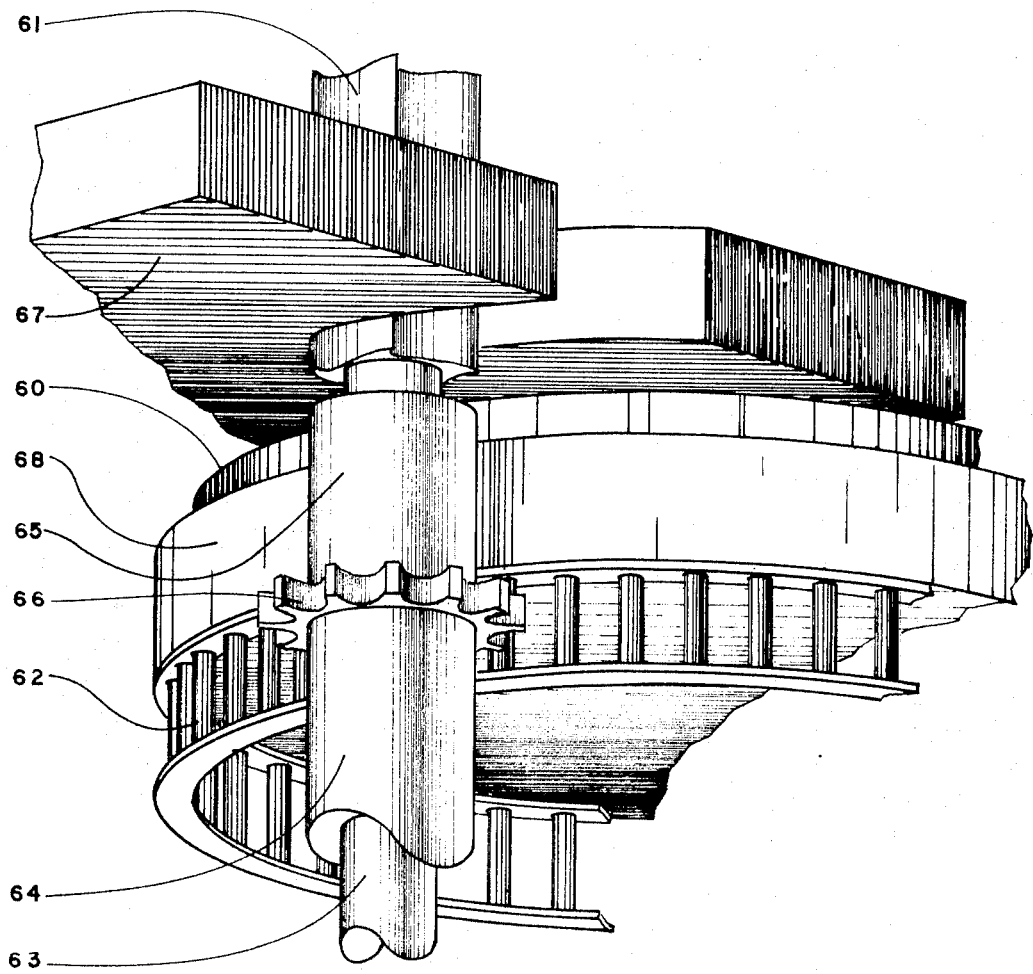
FIG. 4 is a partial perspective view illustrating a further embodiment of the invention.

A further embodiment according to the invention is illustrated in FIG. 4. As shown, the underside of a platform 60 of the type illustrated either in FIGS. 1 and 3 as provided with a chain 62 secured thereto. A material workpiece 67 is attached to the upper surface of the platform 60 in a manner previously described. The platform 60 also has a shaped edge 68 having a shape which is desirably reproduced on the material workpiece 67. Again, it will be appreciated that the shape to be reproduced need not be provided along the edge 68 of platform 60 but instead may be a shaped article otherwise attached to the rotating platforms 60 as previously described.

The shaping device includes a shaping tool 61 for cutting the workpiece 67 as illustrated, a sleeve member having an upper portion 65 which acts as a guide member and abuts the shaped edge 68 of platform 60. A drive shaft 63 is attached to a drive member (not shown). A sprocket 66 is attached to sleeve member 64. Thus, the drive means for the shaft 63 and shaping tool 61 also turns sprocket 66 which engages chain 62 attached to the platform 60. In this manner independent drive means for rotating the platform is eliminated. Further, independent biasing means either acting in cooperation with the platform 60 as illustrated in FIG. 1 or on the shaping device as illustrated in FIG. 3 is unnecessary since the rotating motion of the drive shaft 63, guide member 65 and shaping tool 61 will maintain abutment between the guide member surface 69 and shaped edge 68 of platform 60. Thus, the only requirement is that either platform 60 or shaping device be provided with means for reciprocal motion such as described in connection with FIG. 1 or FIG. 3.

Since for most shaping operations, the shaping tool 61 will necessarily be rotating at a much faster speed that that desired for the platform 60, it will be preferred to include suitable internal bearings between the shaft 63 and sleeve 64.

It will be noted as shown in FIG. 4 and as explained previously in connection with embodiments shown in FIGS. 1 and 3 that the guide member is maintained in fixed relationship with shaping tool. However, it should be appreciated that the guide member need not be rotatably attached to a common shaft with shaping tool as illustrated in FIG. 5 but may extend independently from some other portion of the shaping device. Thus, the guide member need not rotate at all but simply provide a bearing surface against which a shaped member to be copied abuts. Further, in the device shown in FIG. 1 the guide member need not be adjacent to the shaping tool but actually may be positioned adjacent the platform at the end opposite from the shaping tool along the axis of the reciprocating platform. Accordingly, so long as the guide member is maintained in a fixed position from the shaping tool and in abutment with the shaped piece which shape is to be reproduced on a material workpiece, the method of shaping such a workpiece utilizing the concept and devices disclosed hereinabove will be accomplished.

As previously noted a plurality of different shaping or working devices may be used in combination with the feeding device disclosed herein. The term shaping tool is intended to include any cutting or working tool and the concept may include various assembly devices. Thus, those previously noted as well as saws, planers, painting devices, stamping devices and even printers may be used with such a feeding device with any number of materials attached thereto. Electronic or computer means for providing guidance of the device in lieu of a template may also be used but in view of the simplicity and accuracy of the device previously described are not required. These as well as other embodiments and and advantages within the purview of the invention disclosed herein will be evident to those skilled in the art.

I claim:
1. An independent feeder device for directing a material workpiece to shaping tool comprising:
 a. an upper rotatable platform for attaching a material workpiece,
 b. a lower non-rotatable reciprocating platform for supporting said upper platform,
 c. biasing means secured to said lower platform for constantly urging it toward a guide member,
 d. template means secured to said upper platform, and
 e. drive means for rotating said upper platform independent from said tool.

2. The device of claim 1 wherein the guide member is fixedly positioned apart from the shaping tool.

3. A method of feeding a material workpiece to a shaping tool comprising utilizing the device of claim 1.

4. The device of claim 1 wherein said template means comprises the upper platform edge.

5. The device of claim 1 including an axle attached to said upper platform about which said upper platform rotates and wherein said drive means drives said axle.

6. The device of claim 5 wherein said drive means is secured to said lower platform.

7. The device of claim 1 including guide rods for guiding said lower reciprocating platform.

8. The device of claim 1 wherein said drive means is reversible.

* * * * *